US007877644B2

(12) United States Patent
Stenzel

(10) Patent No.: US 7,877,644 B2
(45) Date of Patent: Jan. 25, 2011

(54) COMPUTER APPLICATION PERFORMANCE OPTIMIZATION SYSTEM

(75) Inventor: Harley Andrew Stenzel, Hillsborough, NC (US)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 11/737,256

(22) Filed: Apr. 19, 2007

(65) Prior Publication Data

US 2008/0263401 A1    Oct. 23, 2008

(51) Int. Cl.
*G06F 11/00* (2006.01)

(52) U.S. Cl. ............... 714/47; 714/4; 714/31; 719/328

(58) Field of Classification Search ........... 714/47, 714/4, 31; 719/328
See application file for complete search history.

(56) References Cited

U.S. PATENT DOCUMENTS

| | | | |
|---|---|---|---|
| 5,819,028 A * | 10/1998 | Manghirmalani et al. ..... 714/57 |
| 6,456,306 B1 * | 9/2002 | Chin et al. ................... 715/810 |
| 6,477,572 B1 * | 11/2002 | Elderton et al. ............. 709/224 |
| 6,611,866 B1 * | 8/2003 | Goldman ..................... 709/224 |
| 6,625,657 B1 * | 9/2003 | Bullard ........................ 709/237 |
| 6,684,244 B1 * | 1/2004 | Goldman et al. ............ 709/223 |
| 6,735,200 B1 * | 5/2004 | Novaes ........................ 370/390 |
| 6,941,379 B1 * | 9/2005 | Dingsor et al. .............. 709/235 |
| 7,003,564 B2 * | 2/2006 | Greuel et al. ............... 709/224 |
| 7,076,695 B2 * | 7/2006 | McGee et al. ................. 714/47 |
| 7,079,010 B2 * | 7/2006 | Champlin ............. 340/286.02 |
| 7,088,255 B2 * | 8/2006 | Ridolfo et al. .............. 340/635 |
| 7,099,942 B1 * | 8/2006 | Wilson et al. ............... 709/224 |
| 7,234,073 B1 * | 6/2007 | Roytman et al. ................ 714/4 |
| 7,249,170 B2 * | 7/2007 | Tindal et al. ................. 709/223 |
| 7,272,613 B2 * | 9/2007 | Sim et al. ............................ 1/1 |
| 7,296,194 B1 * | 11/2007 | Lovy et al. ..................... 714/57 |
| 7,302,398 B2 * | 11/2007 | Ban et al. ........................ 705/2 |
| 7,350,209 B2 * | 3/2008 | Shum ......................... 718/104 |
| 7,373,556 B2 * | 5/2008 | Srivastava et al. ............. 714/47 |
| 7,382,738 B2 * | 6/2008 | Ravindran et al. .......... 370/254 |
| 7,428,300 B1 * | 9/2008 | Drew et al. .............. 379/29.09 |
| 7,640,258 B2 * | 12/2009 | Garcea et al. ....................... 1/1 |
| 7,656,810 B2 * | 2/2010 | Horton et al. ............... 370/242 |
| 7,702,779 B1 * | 4/2010 | Gupta et al. ................. 709/224 |
| 7,743,128 B2 * | 6/2010 | Mullarkey ................... 709/223 |
| 2002/0013843 A1 * | 1/2002 | Schweitzer et al. ......... 709/224 |
| 2002/0059424 A1 * | 5/2002 | Ferguson et al. ............ 709/226 |
| 2002/0173997 A1 * | 11/2002 | Menard et al. .................. 705/7 |

(Continued)

*Primary Examiner*—Scott T. Baderman
*Assistant Examiner*—Loan L. T. Truong

(57) ABSTRACT

A complex user-facing computer application often has run-time dependencies on other computer applications. The other computer applications may, in turn, have run-time dependencies on still other applications. A supporting application might run on multiple hosts and a particular host might be chosen by a higher-level application in order to meet requirements such load balancing or reliability. In order to facilitate intelligent choices by higher-level applications in the system, each server in the system is responsible for generating a performance capability or health score that reflects the health of local components and the health of all servers on which the given server has a direct run-time dependency. A particular server's generated health score is advertised to any other server that has a direct run-time dependency on the particular server. Decisions about which of alternative lower-level servers to use in a servicing a client request are made using a routing or hop-at-a-time approach.

4 Claims, 7 Drawing Sheets

U.S. PATENT DOCUMENTS

| | | | |
|---|---|---|---|
| 2003/0158933 A1* | 8/2003 | Smith | 709/224 |
| 2005/0172306 A1* | 8/2005 | Agarwal et al. | 719/328 |
| 2006/0143499 A1* | 6/2006 | Ferguson et al. | 714/4 |
| 2006/0184926 A1* | 8/2006 | Or et al. | 717/168 |
| 2006/0190602 A1* | 8/2006 | Canali et al. | 709/226 |
| 2007/0016393 A1* | 1/2007 | Vinberg et al. | 703/13 |
| 2007/0033060 A1* | 2/2007 | Gopalan et al. | 705/1 |
| 2007/0101167 A1* | 5/2007 | Lindley et al. | 713/300 |
| 2007/0168919 A1* | 7/2007 | Henseler et al. | 717/101 |
| 2007/0266198 A1* | 11/2007 | Bousis | 711/4 |
| 2008/0083029 A1* | 4/2008 | Yeh et al. | 726/22 |
| 2008/0126354 A1* | 5/2008 | Wang et al. | 707/10 |

* cited by examiner

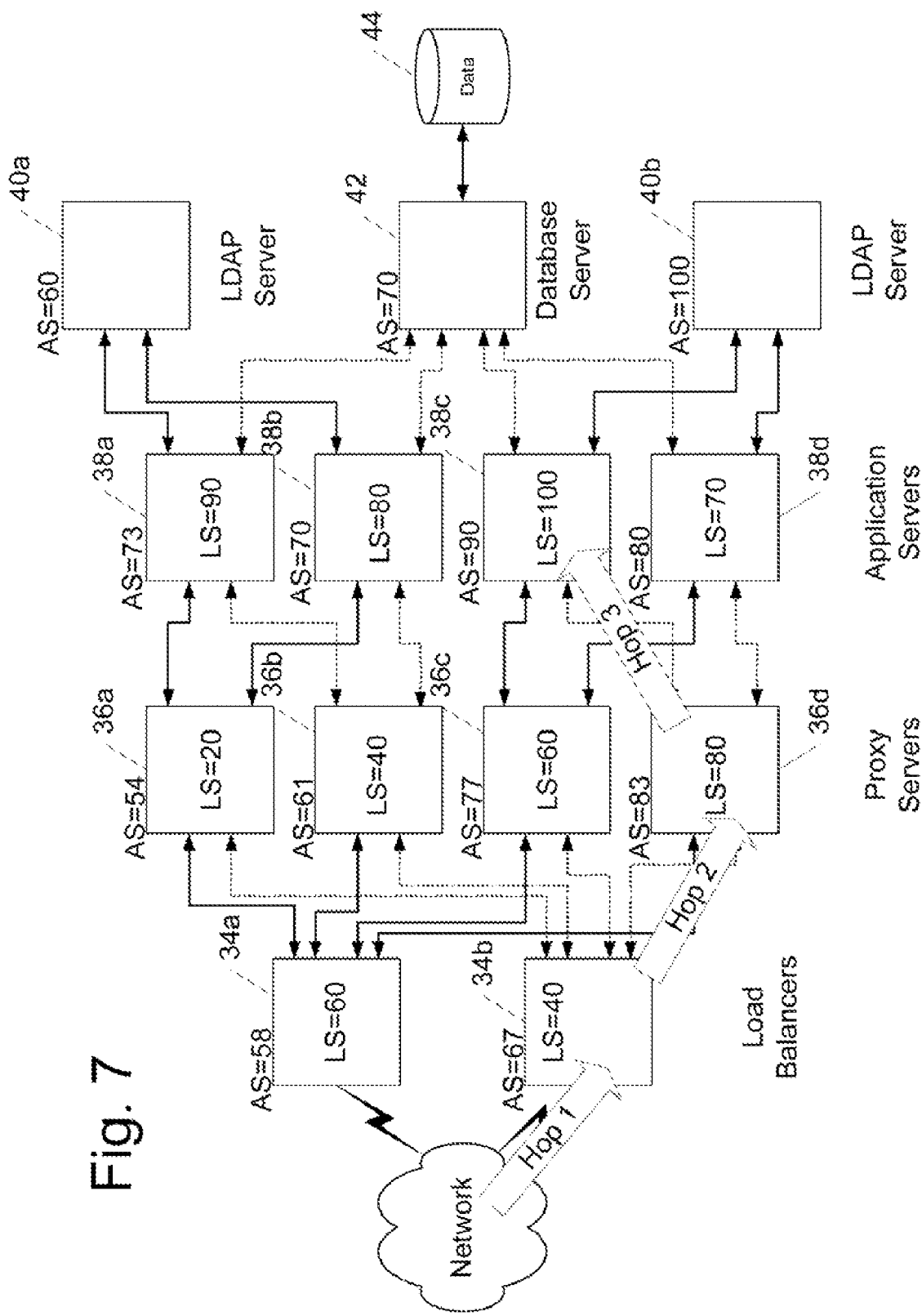

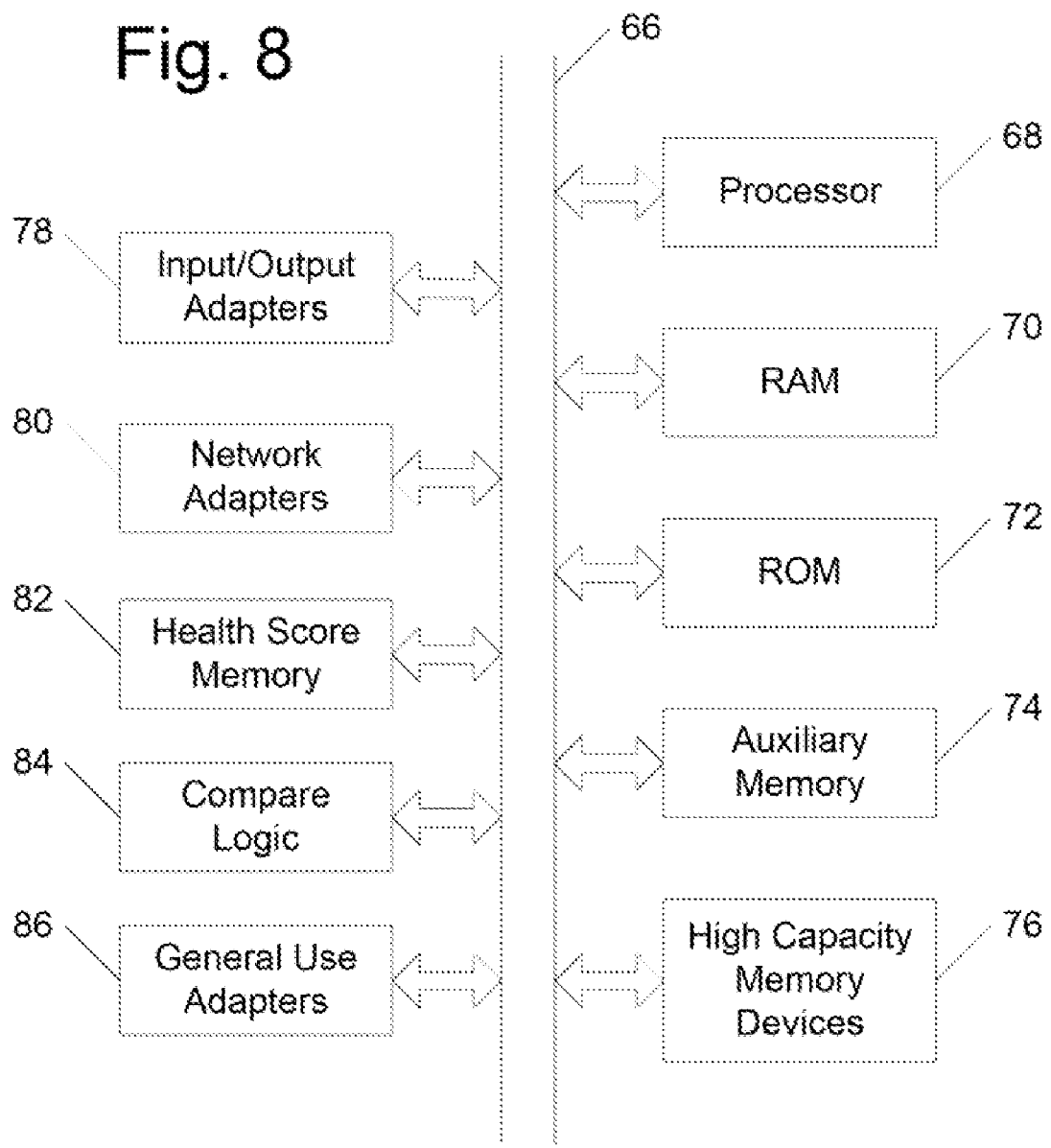

COMPUTER APPLICATION PERFORMANCE OPTIMIZATION SYSTEM

FIELD OF THE INVENTION

The present invention relates to computer systems and more particularly to a performance optimization system for network computer system applications.

BACKGROUND OF THE INVENTION

In a simple computer system environment, a computer application or program may execute on a single computer independently of other computers or supporting services, such as database instances.

While simple computer systems of the type described above may have been the norm at one time, the current norm may be characterized as a much more complex environment in which a computer application, while nominally executing on a local system, actually has one or more run-time dependencies on other supporting computer systems. The term run-time dependency means that one service cannot continue execution of its application without interaction with another service. In a complex environment, an application may also have indirect run-time dependencies since one or more of the services it depends on may, in turn, require other run-time services.

The fact that a computer application may have a chain of dependencies stretching across several tiers of computer systems becomes significant where one or more of the supported systems can elect to receive the support it needs from one of several of the supporting systems.

A good example of that type of system is a web application. One common deployment topology for a web application is a load balancer in front of a tier of http proxies in front of a tier of web application servers which use data from a database server and credentials from a LDAP server. Where multiple servers are available to provide a service, those servers are sometimes referred to collectively as a cluster.

Protocol load-balancing devices, called load balancers, distribute work to be performed among multiple applications as identified by network address. A load balancer multiplexes client requests among a set of back-end server daemons transparently to the client. Load balancing improves application scalability by permitting multiple computer systems to provide a single service. Load balancing also provides fault tolerance by redirecting work that previously had been done by a failed computer system.

A load balancer is typically considered to be a virtual service that is bound to a number of real services (processes or programs or applications) running on real servers. When dealing with a client request, the load balancer forwards the request to one of the real servers which provides the service required by the client request.

How well a particular server in a cluster is performing is often referred to as the "health" of the server. Some metrics often used to measure server health include the amount of time it takes for the application daemon to respond to a request, the memory usage of the server operating system or application daemon, and the CPU usage of the system or the server daemon. Also, some application daemons may not be expected to perform as well as others if the capacity (memory or CPU) available to the underlying operating system is less.

Even though the health or capacity of a server may be important, some load balancers don't even attempt to assess these, operating on the sometimes-unfounded assumption that all of the servers in a server cluster are exhibiting the same level of performance.

Other load balancers attempt to monitor the health of a server either by sending periodic queries to the server or by installing an agent on the server that monitors operations performed by hardware and software resources of the server and periodically reports the results back to the load balancer.

Knowing how well the hardware and software resources of a particular server are performing may not be enough to allow a load balancer to make an optimal decision whether or not to choose that server. The server's performance at a given time is going to depend not only on its own "local" hardware and software resources but also on the performance of still other servers on which the given server is itself directly or indirectly dependent. In some situations, the supporting servers may themselves be members of a server cluster and may have their own chain of dependencies. The greater the number of tiers or steps between the load balancer and a set of subordinate servers, the less likely it is that the load balancer will have adequate information about the subordinate servers.

SUMMARY OF THE INVENTION

The present invention may be implemented as a supported server for use in a computer network having multiple levels or tiers of additional servers, each of which provides one or more functions on which other servers in the network depend. The supported server includes a receiver component for receiving a health score from one or more supporting servers in the set of servers on which the supported server has a direct run-time dependency. The health score provided by a supporting server is a function of the performance of components of the supporting server and of one or more health scores made available to the supporting server by one or more other servers on which the supporting server has a run-time dependency. The supported server further includes a calculating component for aggregating health scores received from two or more supporting servers and an advertising component for informing one or more other servers of the first server health score.

BRIEF DESCRIPTION OF THE DRAWINGS

While the specification concludes with claims that particularly point out and distinctly claim that which is regarded as the present invention, specific details of the invention may he more readily ascertained from the following detailed description when read in conjunction with the accompanying drawings wherein;

FIG. 7 is still another modified view of the computer system of FIG. 3 showing the propagation of a hypothetical set of health scores; and FIG. 8 is a schematic representation of both hardware and software components of a typical server on which the present invention might be implemented.

DETAILED DESCRIPTION

From time to time, this specification will use the term "server" in describing a network component that provides a specific function. The possibility exists that a single physical server may be dedicated to providing the specific function. In many cases, however, the term "server" may actually refer to a service that is provided by some combination of physical and virtual software and hardware components; e.g., a service application instance running on top of an operating system instance. The term "server" should be construed broadly enough to include both a physical server dedicated to providing a particular service and to any combination of real and/or virtual software and hardware components that interact to provide the same service and/or a software process providing the same service. Similarly, references to "machines" or "hosts" should be construed broadly enough to permit operating system virtualization technologies.

Figure 1:
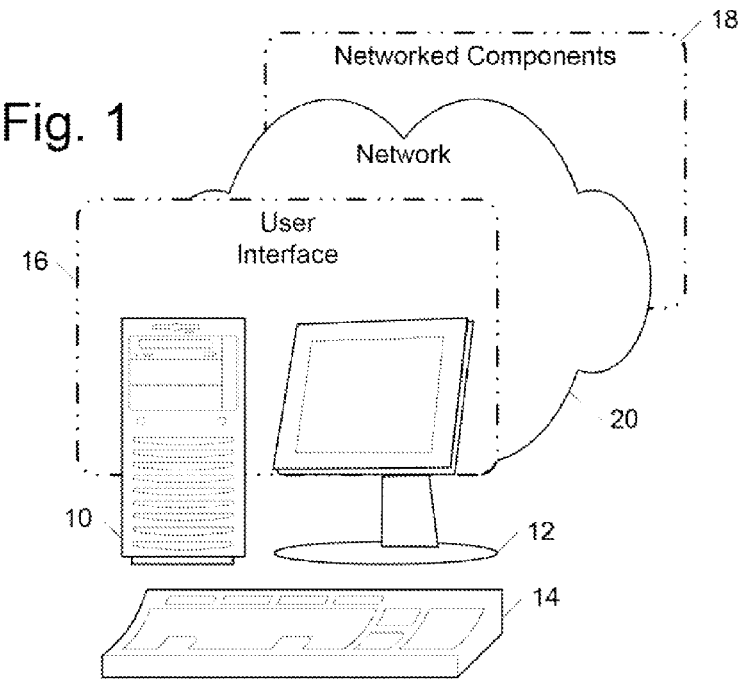
FIG. 1 is a schematic illustration of high level components that support an external user interface to a networked application.

FIG. 1 is a high-level representation of a typical environment for execution of a computer application. An end user interacts with the application through a set of components that typically includes both hardware (e.g., a system unit 10, a computer display 12, a keyboard 14, etc.) and software (e.g., an operating system, a web browser application, etc.). From an end user's perspective, these components provide a user interface layer 16 of functionality that makes it appear, for all intents and purposes, as if the application were being executed directly on the system unit 10.

In reality, only a small part of the application code may be resident on the system unit 10. The vast bulk of the application code will be running in remote servers that are included in a layer 18 of network components that drive the user interface layer 16 through an interposed network 20, such as a proprietary wide area network or a public wide area network, such as the Internet.

In a typical network application environment, the execution of the application may involve execution of code in a number of computer systems logically connected in a layered or tiered environment in which each computer system supports applications running in higher tiers while being supported by still other computer systems running in lower tiers. A higher tier is one closer to the end user interface while a lower tier is one further away from that interface. A computer system that is logically closer to the end user interface than another computer system may be identified as being upstream from the other computer system. Conversely, a computer system that logically more distant from the end user interface than another computer system may be identified as being downstream from the other computer system.

Figure 2:
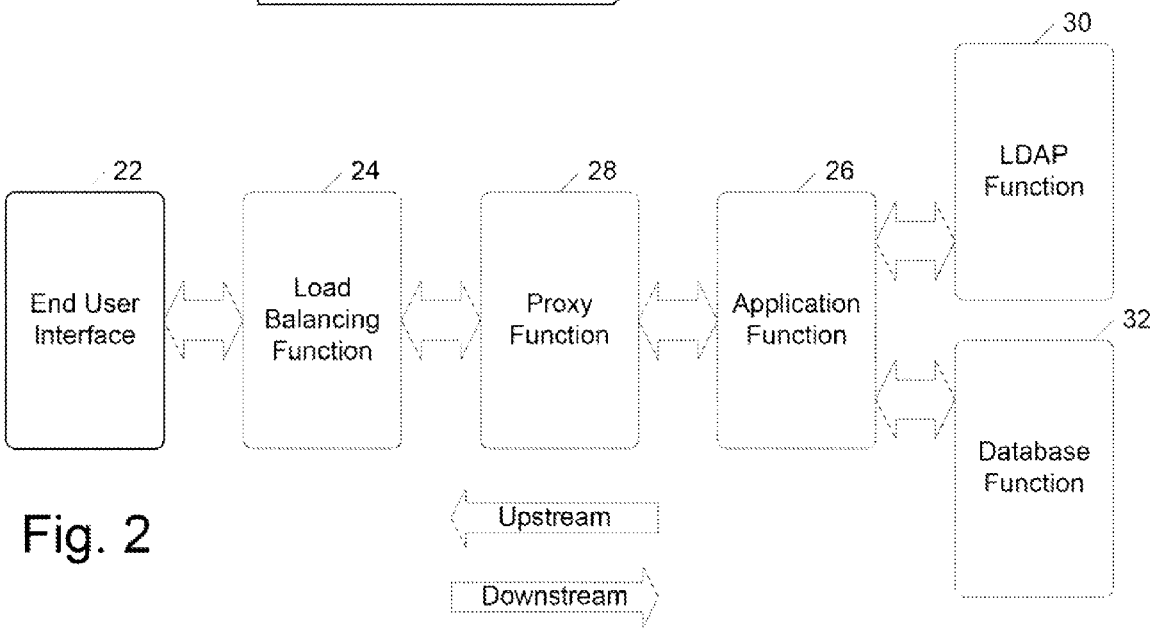
FIG. 2 is a block diagram of functions that must be provided in the network to support a particular type of network application in a load-balancing environment.

FIG. 2 includes left and right facing arrows showing the terms "upstream" and "downstream" used in the context of a block diagram illustration of a load-balancing system used to control the availability of an application to end users. Each of multiple end users can establish access to the application through an end user interface 22 which typically includes the hardware components shown in FIG. 1. While only a single end user interface is illustrated, the illustrated interface is intended to be representative of the interfaces needed by many end users that typically want to be able use the application.

Most end users of an application presented at the user interface will not even be aware the application is supported by multiple services performed in the network, including a load-balancing function 24, the purpose of which is to distribute requests for access to the application to one of multiple servers running copies of the application in an application function tier 26. One or more proxy servers in a proxy function tier 28 are interposed between the load balancer tier 24 and the application function tier 26. Servers in the application function tier 26 receive support from LDAP servers in an LDAP function tier 30 and from a least, one database server in a database function tier 32.

While a server in the load-balancing tier 24 may interact directly only with downstream servers in the proxy tier 28, the choice of which server to use in tier 28 depends not only on how well the servers in that tier are performing but also upon how well servers in the downstream tiers 26, 30 and 32 are performing; it; i.e., upon the health of the servers in those downstream tiers. However, since a server in the load-balancing tier 24 does not interact directly with those servers (and may not even know those servers exist), there has been no convenient way for the server to know the impact the health of those servers may have on its own performance capabilities.

Figure 3:
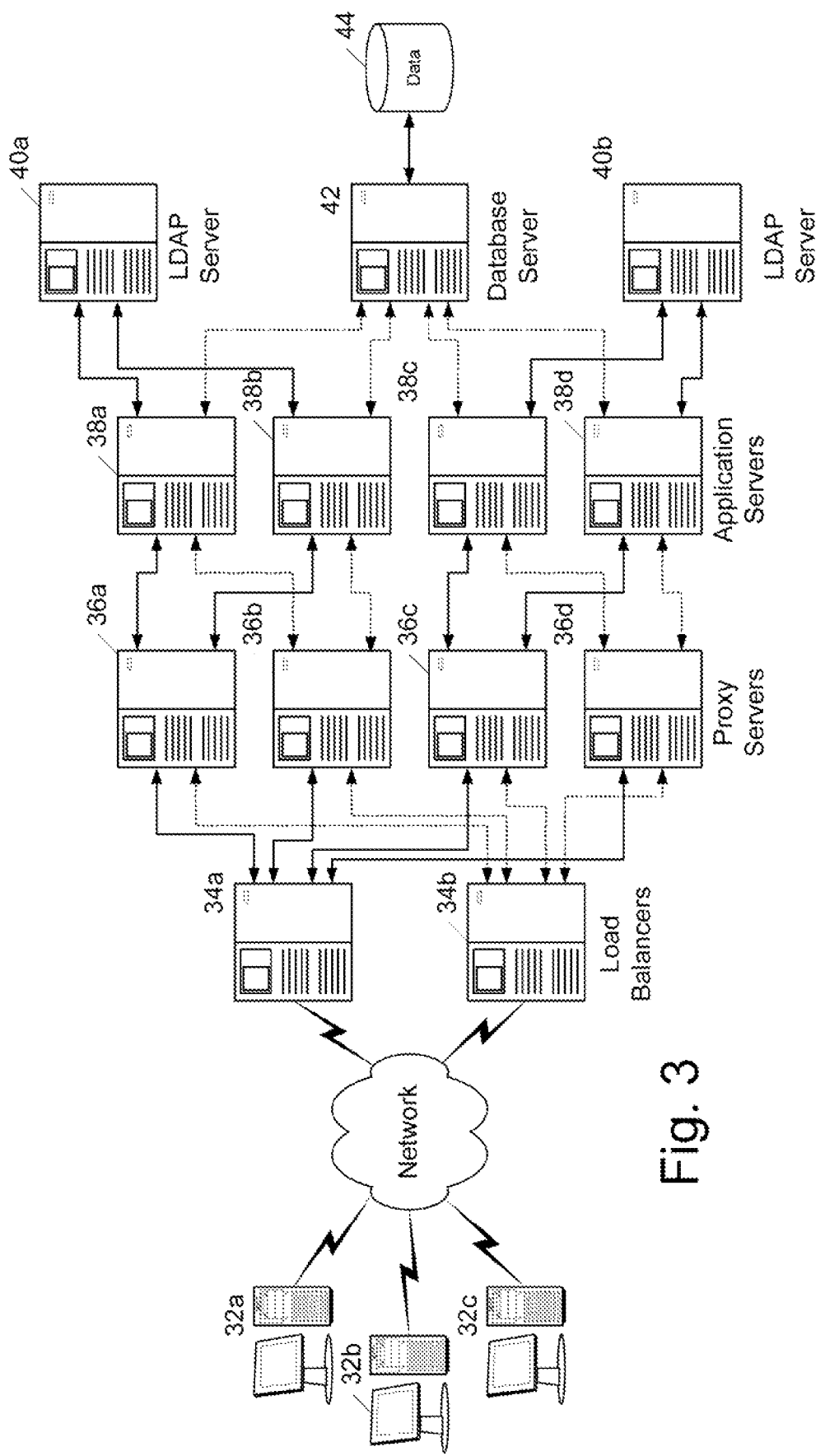
FIG. 3 is a schematic diagram of an arrangement of real resources that can be used in implementing the functions illustrated in FIG. 2.

The complexity of the problem may be better illustrated by reference to FIG. 3, which is an illustration of servers that might be used to implement the layered functional environment discussed above with reference to FIG. 2. It is assumed that a least three different end users 32a, 32b, 32c are concurrently requesting access to the same networked application. To accommodate these and other end users (not show) multiple instances of the application execute concurrently on a set of application servers 38a-38d. All four of the application servers 38a-38d require the support of a single database server 42 connected to a database 44; i.e., have run-time dependencies on the database server 42. All four of the application servers 38a-38d also require the support of an LDAP server.

Two LDAP servers are shown. LDAP server 40a provides support to application servers 38a and 38b while LDAP server 40b supports application servers 38c and 38d. The performance of each application server is, of course, affected by the performance (health) of the supporting components to which it is logically connected. Specifically, the performance of application servers 38a and 38b will be affected by the health of LDAP server 40a and database server 42 while the performance of application servers 38c and 38d will be affected by the health of LDAP server 40b and database server 42.

In turn, the health of the application servers 38a, 38b, 38c, 38d affects the health of those of the proxy servers 36a, 36b, 36c and 36c that they directly support. More specifically, the health of application server 38a directly affects the health of proxy servers 36a and 36b, the health of application server 38b directly affects the health of the same proxy servers, the health of application server 38c directly affects the health of proxy servers 36c and 36d, and the health of application server 38d directly affects the health of proxy servers 36c and 36d.

Proxy servers typically provide a host of proxy services beyond load balancing to other systems in the network. For example, proxy servers 36a, 36b, 36c, 36d may provide static page hosting and session affinity services for the application servers. For purposes of this application, any services provided by the proxy servers beyond load balancing are ignored.

Similarly to what is already discussed, the health of the proxy servers 36a, 36b, 36c, 36d directly affects the health or capacity of the load balancers 34a, 34b. As the aggregated health or capacity of the proxy servers decreases, so does that of the overall site. Thus, the health of load balancer 34a is directly affected by the health of proxy servers 36a and 36b while the health of load balancer 34b is directly affected by the health of proxy servers 36c and 36d.

To make it possible for servers, such as load balancers 34a and 34b to make choices which take into account the health of the all servers which provide direct or indirect support without necessarily interacting directly with each of those servers, the present invention imposes an obligation on each server in the network to determine its own health based on the health of local components as well as the health of any downstream servers on which it has a direct run-time dependency and to then to advertise or make available that determined health score to any upstream server which it directly supports.

Figure 4:
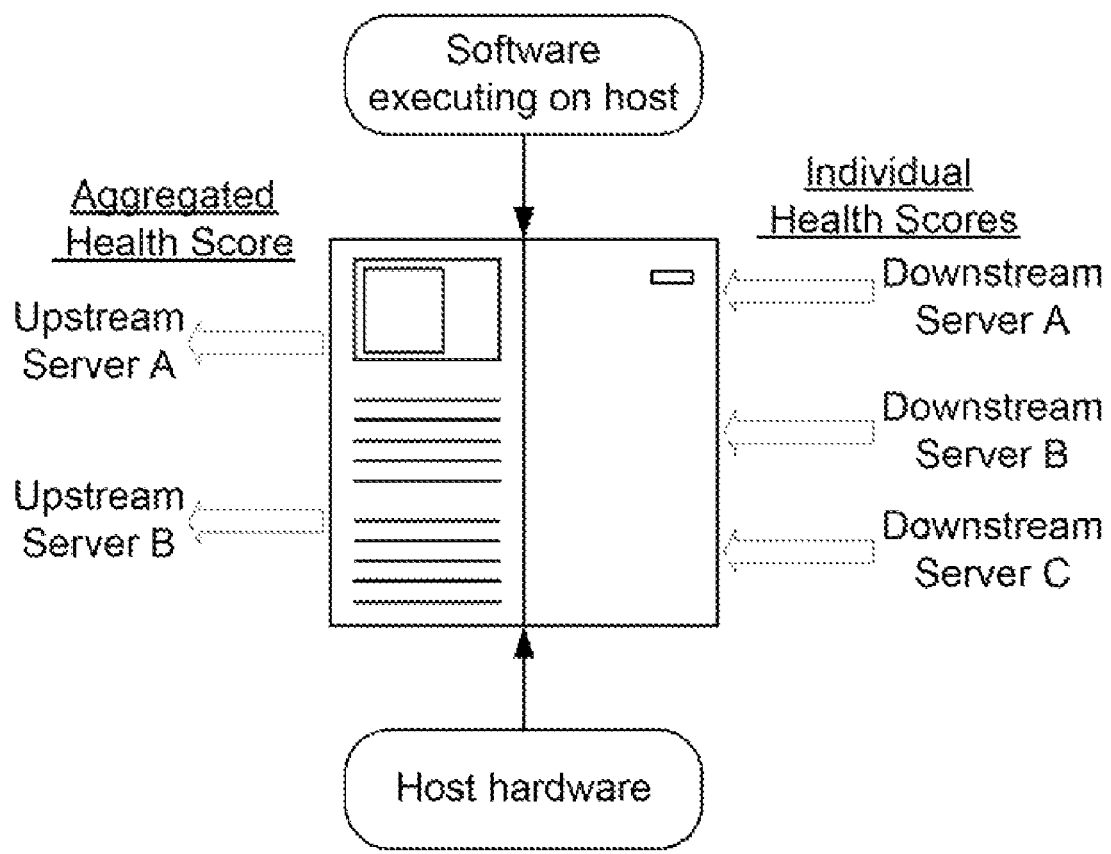
FIG. 4 is a schematic representation of an individual server showing hardware and software components as well as run-time dependencies and/or support for other servers.

Referring to FIG. 4, the health score computation for a given server can reflect the health or performance of both hardware and software components that are local to the host machine at the server. However, the health score also reflects individual health scores from all downstream servers on which the given server has a direct run-time dependency. There is no single algorithm that must always be used in calculating a health score for an instance of a service provided by a server. The choice of algorithm will depend on such things as the functions being performed and/or the relative importance of any different run-time dependencies that may need to be taken into account. A deployed J2EE application may depend on a database service, a LDAP service, and capacity remaining on the underlying operating system. If any of these are not available, then the deployed J2EE application is also not available. However, a service may be provided by multiple instances. So, if that J2EE application depends on the LDAP service, and there are two instances of that service defined, and one is not available, then the deployed J2EE application is still available, but possibly with reduced capacity.

The end result of the health score computation is an aggregated health score for the given server. The aggregated health score is advertised to each upstream server having a direct run-time dependency on the given server. For purposes of illustration, FIG. 4 shows that two upstream servers (A and B) have a direct run-time dependency on the given server. Each of the upstream servers performs its own health score computation based on the health of its own hardware and software components and on the health score reported by the given server.

Figure 5:
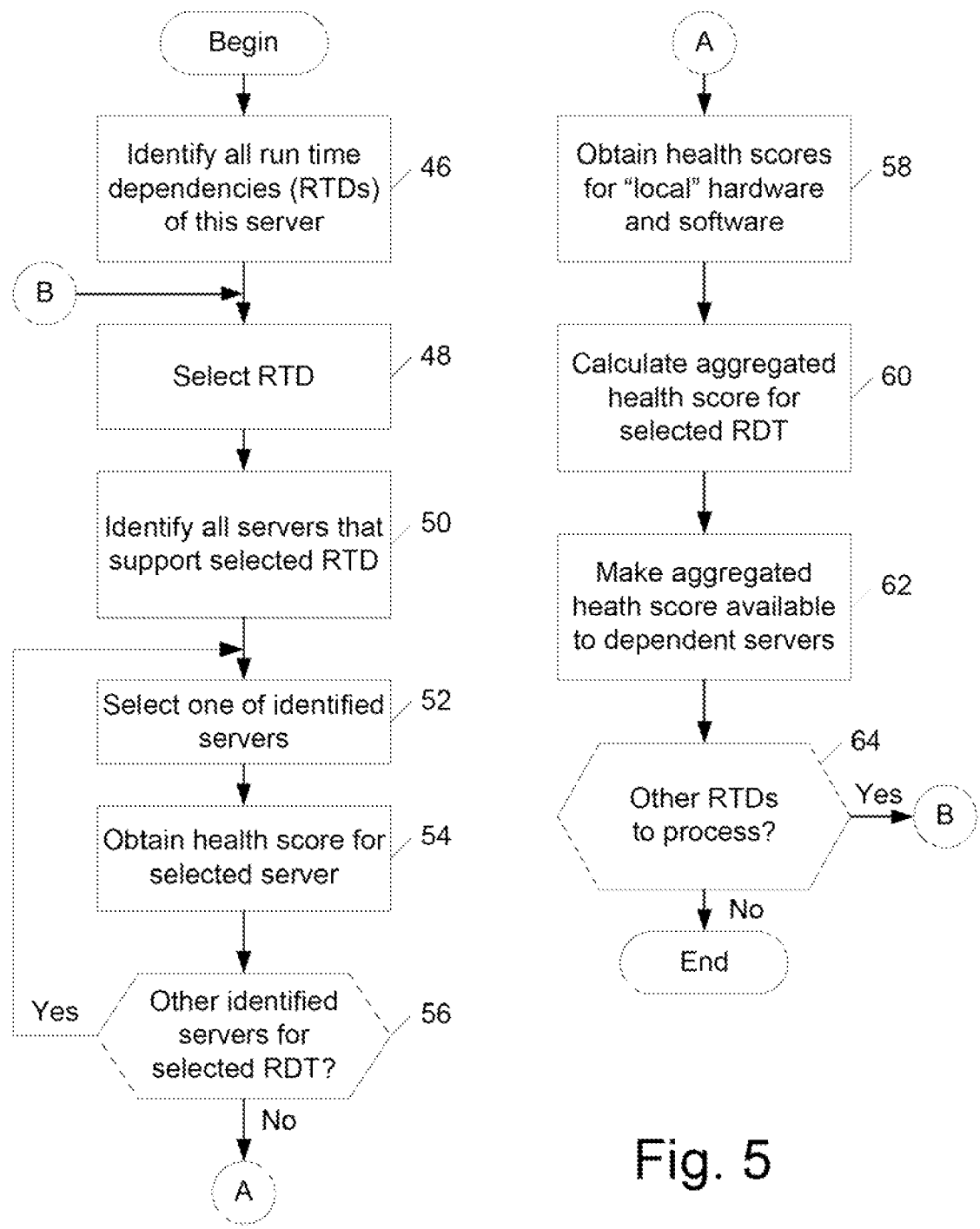
FIG. 5 is a flow chart of steps that may be performed in generating a health score for an individual server of the type illustrated in FIG. 4.

FIG. 5 is a flow chart of steps that can be performed by a single server in determining one or more aggregated health scores to be made available to upstream servers. Up until now, a simplifying assumption has been made that a given server can have only a single run-time dependency on downstream servers. Realistically, a given server might have multiple run-time dependencies that could be supported by different sets of downstream servers, each different set being part of an alternative configuration of supporting downstream servers. To deal with this complication, the process begins with a step 46 identifying all of run-time dependencies (RTDs) of the server. Once the different RTDs have been identified, one of the RTDs is selected in step 48. In step 50, all downstream servers that support the selected RTD are identified. One of the downstream servers is selected in step 52 and the health score of the selected server is obtained in step 54. A check is made to see whether there are other identified downstream servers for the selected RTD. If there are, the program returns to step 52. The loop including steps 52, 54 and 56 is repeated until all of the downstream servers supporting the selected RTD have been selected and their health scores obtained.

Health scores for the local hardware and software components of the server are obtained in step 58. An aggregated health score for the selected RTD is generated in step 60 and is advertised to upstream servers in step 62.

A check is then made as to whether the local server has other identified RDTs for which aggregated health scores need to be determined. If there are other RDTs, the program returns to step 48 and repeats the ensuing steps until all of the required aggregated health scores have been determined.

Because each server looks at not only the health of its own local hardware and software components but also at reported health scores provided by downstream servers on which it has a direct run-time dependency, the health scores for individual systems can be thought of as propagating upwardly through the network one tier at a time until the scores are factored into the health score computation performed for servers in the network tier closest to the user interface.

Figure 6:
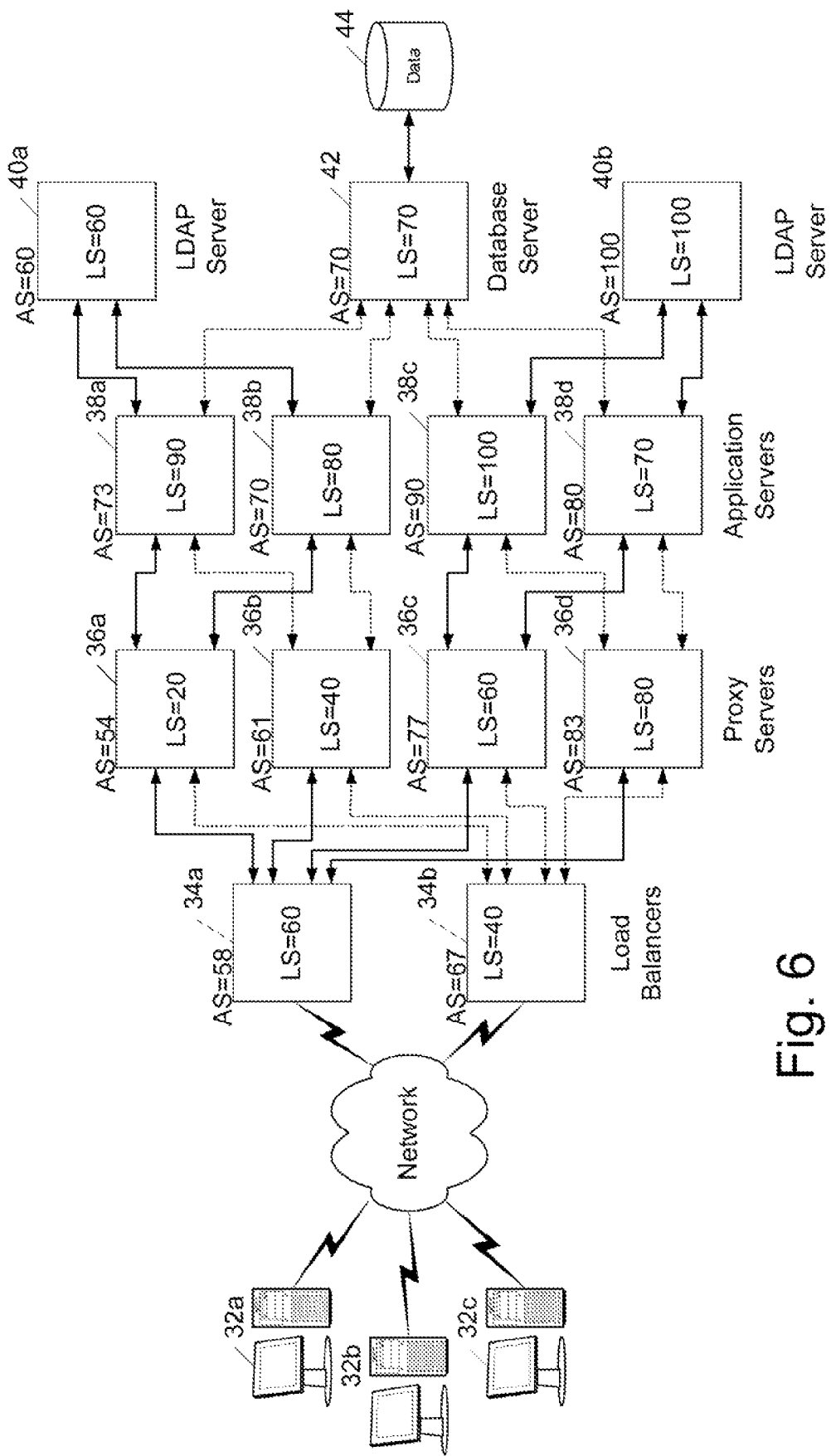
FIG. 6 is a modified view of the computer system previously described with reference to FIG. 3 where the modifications are used to explain how server health scores propagate through the system.

This upward propagation is shown in FIG. 6 which is a modified representation of the network previously discussed with reference to FIG. 3. In FIG. 6, local scores (LS) are associated with each of the servers and represent the health of local hardware and software components. An aggregated health score (AS) is then determined for each server using a simplified algorithm (to be described) for purposes of illustration only.

The simplified algorithm assumes that the local health score at a server and each health score advertised by a downstream server is to be given the same weight and that the aggregated health score for the server is simply the average of the local score and any reported, aggregated scores from downstream servers.

Referring to FIG. 6 to illustrate the application of this algorithm, it should first, be noted that the aggregated score for each of the LDAP servers 40a and 40b and for the database server 42 is assumed to be the same as the local score due to an assumption that none of these servers has any run-time dependencies on downstream servers. Referring now to application server 38a, the server is assigned a local score LS=90 and two aggregated health scores AS=60 and AS=70 made available by the downstream servers 40a and 42 on which it has direct run-time dependencies. Using the simplified, algorithm described above, application server 38a will generate its own aggregated health score as the average value 73 of the three inputs 90, 60 and 70. The actual average value is, of course, equal to 73.33. To simplify the description, any non-integer result is rounded to the nearest integer.

Similarly, application server 38b generates its own aggregated health score based on its own local health score and the aggregated health scores made available by servers 40a and 42. Because the local health score for application server 38b is lower than the local health score of application server 38a, the aggregated health score for server 38b is also lower; that is, 70 rather than 73.

Similar computations are performed for the remaining application servers 38c and 38d to generate aggregated health scores that are made available to the upstream proxy servers having direct run-time dependencies on servers 38c and 38d; namely, proxy servers 36c and 36d. The same methodology is used in determining an aggregated health score for each of the servers in the illustrated network.

Each set of physical servers may be considered as being supported by a single abstracted service. For example, the physical load balancing servers 34a and 34b may be viewed as being supported by a single abstracted load balancing service which can choose either of the physical servers to perform load balancing in response to a client request. For the values shown in FIG. 6, the abstracted service would have a choice of assigning a load-balancing request to either physical server 34*a* or 34*b*. Given that the physical server 34*b* has a better aggregated health score than server 34*a* (67 vs. 58), the abstracted service would probably give priority to physical server 34*b*.

An abstracted service provided at load-balancing server 34*b* would employ the same methodology in deciding which of the proxy servers 36*a*, 36*b*, 36*c*, 36*d* to select in filling the load-balancing request. Normally, proxy server 36*d* would be the first choice given that its aggregated health score (AS=83) is higher than that of any of the other proxy servers.

The process of selecting the "healthiest" server in the next lower tier of servers is repeated at successively lower tiers in what can be characterized as a "hop-at-a-time" approach similar to that used in network routing. This can be seen in FIG. 7 wherein the "healthiest" path through the network is shown as being established or built in successive hops Flop 1 through Hop 3.

A server capable of implementing the present invention will include many of the components commonly found in all servers. Referring to FIG. 8, an internal bus 66 is used to exchange data and control signals among a number of components, including a processor 68, a RAM or Random Access Memory 70, a ROM or Read-Only Memory 72, auxiliary memory 74 and one or more high-capacity memory devices 76. The auxiliary memory includes memory that performs specific functions, such as data caching. ROM 72, auxiliary memory 74 and memory devices 76 are computer storage mediums that may be used to store computer usable program code as well as data. Many different technologies can be used to implement these memory devices, including magnetic, semiconductor and optical technologies. Depending on the technology, the memory media may or may not be removable. There is no intent to limit the invention to specific memory technologies.

The server will typically also include a set 78 of input/output adapters which can be used to receive operator input through typical input devices, such as keyboards, and to provide operator output through displays, printers and other standard input/output devices. Given that the server is assumed to be a network server, it will necessarily include one or more network adapters 80. It will also probably include a set 86 of general use adapters, such as USB or Fire Wire adapters which can be used to connect many different types of devices to the server.

The server will also include a health score memory 82 for receiving and storing aggregated health scores received from lower tier servers. The program instructions for implementing the score generation process described with reference to FIG. 5 may be stored in one of the standard memories and executed in RAM memory 70 under the control of processor 68. Finally, the server will include compare logic 84 that will be used as part of the hop-at-a-time process of selecting servers are to be used in satisfying requirements such as load-balancing.

While details of possible embodiments of the invention have been described above, it is understood that variations and modifications and embodiments may occur to those of ordinary skill in the art once they learn of these details, it is intended that the appended claims shall be construed to include both the presented embodiments and all variations and modifications that fall within the true spirit and scope of the invention.

What is claimed is:

1. For use in a multi-tier computer network wherein each tier other than the top tier includes one or more servers that directly support one or more servers in a higher tier, a method of selecting servers in each of the tiers to optimize performance of an application executing in one of the tiers, said method comprising the steps of:
   beginning at a server in the lowest tier in the network, generating an aggregated health score based on the performance capability of hardware and software components of said server and on any aggregated health scores reported by other servers that directly support said server and making the generated aggregated health score available to any server in a higher tier that has a direct run-time dependency on said server;
   repeating the foregoing steps for servers in successively higher tiers in the network until aggregated health scores have been generated for each server in the computer network;
   at a server at the highest tier in the network, identifying each server in an adjacent lower tier on which said server has a direct run-time dependency, receiving an aggregated health score from each such server, comparing the received health scores and selecting the server having the most favorable health score; and
   beginning at the server selected in the preceding step, repeating said step until servers have been selected at all tiers in the network.

2. For use in a multi-tier computer network wherein each tier other than a top tier includes one or more supporting servers that directly or indirectly support a server in said top tier, a method of optimizing the performance of an application executing in said top tier, said supporting servers being connectable in alternative configurations that can provide support for said server in said top tier, said method being performed in said server in said top tier and comprising:
   receiving an aggregated health score for each of two or more of said alternative configurations, each said aggregated health score being based on the current performance capability of each of the servers in the alternative configuration with which the aggregated health score is associated, wherein receiving an aggregated health score at said top tier server for each of two or more of said alternative configurations further comprises,
   beginning at a server in the lowest tier in the computer network, generating an aggregated health score based on the performance capability of hardware and software components of said server and on any aggregated health scores reported by other servers that directly support said server and making the generated aggregated health score available to any server in a higher tier that has a direct run-time dependency on said server, and
   repeating the foregoing steps for servers in successively higher tiers in the network until aggregated health scores have been generated for each server in the computer network in tiers below said top tier;
   selecting the alternative configuration having the highest aggregated health score; and
   using the selected alternative configuration during execution of said application in said top tier server.

3. A computer program product for optimizing the performance of an application executing in a server in the top tier of a multi-tier computer network wherein each tier other than said top tier includes one or more supporting servers that directly or indirectly support a server in said top tier, said supporting servers being connectable in alternative configurations that provide support for said server in said top tier, said computer program product including a computer storage medium embodying computer usable program code that when loaded into and executed by said server in said top tier causes said server to perform a method comprising:

- receiving an aggregated health score for each of two or more of said alternative configurations, each said aggregated health score being based on the current performance capability of each of the servers in the alternative configuration with which the aggregated health score is associated, wherein receiving an aggregated health score at said top tier server for each of two or more of said alternative configurations further comprises,
- beginning at a server in the lowest tier in the computer network, generating an aggregated health score based on the performance capability of hardware and software components of said server and on any aggregated health scores reported by other servers that directly support said server and making the generated aggregated health score available to any server in a higher tier that has a direct run-time dependency on said server, and
- repeating the foregoing steps for servers in successively higher tiers in the network until aggregated health scores have been generated for each server in the computer network in tiers below said top tier;
- selecting the alternative configuration having the highest aggregated health score; and
- using the selected alternative configuration during execution of said application in said top tier server.

4. A top tier server for use in a multi-tier computer network wherein each tier other than the top tier includes one or more supporting servers that directly or indirectly support said top tier server, said supporting servers being connectable in alternative configurations that can provide support for said top tier server, said top tier server comprising:

- a health score memory for receiving an aggregated health score for each of two or more of said alternative configurations, each said aggregated health score being based on the current performance capability of each of the servers in the alternative configuration with which the aggregated health score is associated, wherein receiving an aggregated health score at said top tier server for each of two or more of said alternative configurations further comprises:
- beginning at a server in the lowest tier in the computer network, generating an aggregated health score based on the performance capability of hardware and software components of said server and on any aggregated health scores reported by other servers that directly support said server and making the generated aggregated health score available to any server in a higher tier that has a direct run-time dependency on said server, and
- repeating the foregoing steps for servers in successively higher tiers in the network until aggregated health scores have been generated for each server in the computer network in tiers below said top tier;
- compare logic for selecting the alternative configuration having the highest aggregated health score; and
- logic for using the selected alternative configuration during execution of said application in said top tier server.

* * * * *